(12) United States Patent
Lee et al.

(10) Patent No.: US 11,350,167 B2
(45) Date of Patent: May 31, 2022

(54) DISPLAY DEVICE AND CONTROL METHOD THEREFOR

(71) Applicant: SAMSUNG ELECTRONICS CO., LTD., Suwon-si (KR)

(72) Inventors: Eunjin Lee, Suwon-si (KR); Hansoo Kim, Suwon-si (KR); Hajeong Yun, Suwon-si (KR); Byungjeong Jeon, Suwon-si (KR); Hyoseung Park, Suwon-si (KR); Seongwook Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/954,444

(22) PCT Filed: Nov. 22, 2018

(86) PCT No.: PCT/KR2018/014398
§ 371 (c)(1),
(2) Date: Jun. 16, 2020

(87) PCT Pub. No.: WO2019/132258
PCT Pub. Date: Jul. 4, 2019

(65) Prior Publication Data
US 2021/0092486 A1 Mar. 25, 2021

(30) Foreign Application Priority Data
Dec. 29, 2017 (KR) .................. 10-2017-0184346

(51) Int. Cl.
*H04N 21/466* (2011.01)
(52) U.S. Cl.
CPC ..... *H04N 21/4667* (2013.01); *H04N 21/4666* (2013.01)

(58) Field of Classification Search
CPC .................. H04N 21/4667; H04N 21/4666
See application file for complete search history.

(56) References Cited

U.S. PATENT DOCUMENTS

| | | | |
|---|---|---|---|
| 9,507,424 | B2 | 11/2016 | Ryu et al. |
| 10,524,004 | B2 | 12/2019 | Lee et al. |

(Continued)

FOREIGN PATENT DOCUMENTS

| | | |
|---|---|---|
| KR | 10-1986-0009583 | 12/1986 |
| KR | 10-1987-0010739 | 11/1987 |

(Continued)

OTHER PUBLICATIONS

International Search Report with English translation for PCT/KR2018/014398, dated Mar. 14, 2019, 4 pages.

(Continued)

*Primary Examiner* — Randy A Flynn
(74) *Attorney, Agent, or Firm* — Nixon & Vanderhye, P.C.

(57) ABSTRACT

A display device is disclosed. According to the present invention, a display device comprises: a sensor; a display; a storage unit in which history information on content provided by the display device is stored; and a processor for acquiring, through the sensor, information on the distance between a user and the display device if a preset event occurs, displaying a background screen in the display if the user is identified, on the basis of the acquired information, as existing in a first region among a plurality of regions classified according to the distance from the display device, providing content on the basis of first history information if the user is identified, on the basis of the acquired information, as existing in a second region among the plurality of regions, and providing content on the basis of second history information if the user is identified, on the basis of the acquired information, as existing in a third region among the (Continued)

plurality of regions, wherein the first history information can include information on content provided by the display device during the existence of the user in the second region, and the second history information can include information on content provided by the display device during the existence of the user in the third region. The display device can provide content by using an artificial intelligence (AI) model having been taught according to at least one of machine learning, neural network and deep learning algorithms, in the providing the content.

9 Claims, 11 Drawing Sheets

(56) References Cited

U.S. PATENT DOCUMENTS

| | | |
|---|---|---|
| 2010/0305855 A1 | 12/2010 | Dutton et al. |
| 2011/0206353 A1 | 8/2011 | Yeo |
| 2011/0283320 A1* | 11/2011 | Levin .................... H04N 21/466 725/40 |
| 2012/0246678 A1* | 9/2012 | Barksdale ........ H04N 21/44218 725/37 |
| 2013/0332962 A1* | 12/2013 | Moritz ............. H04N 21/44222 725/46 |
| 2013/0342309 A1* | 12/2013 | Jiang ................. H04N 21/4436 340/3.1 |
| 2014/0208340 A1* | 7/2014 | Poornachandran .......................... H04N 21/4751 725/10 |
| 2014/0354531 A1 | 12/2014 | Foreman |
| 2015/0128158 A1* | 5/2015 | Wheatley ......... H04N 21/42221 725/12 |
| 2015/0264299 A1* | 9/2015 | Leech ................ H04N 21/6587 348/78 |
| 2016/0170584 A1 | 6/2016 | Kumar |
| 2016/0316293 A1* | 10/2016 | Klimanis ............ H04L 12/2823 |
| 2017/0289596 A1* | 10/2017 | Krasadakis ........ H04N 21/4223 |
| 2018/0103230 A1* | 4/2018 | Vitta .................... H04N 21/631 |

FOREIGN PATENT DOCUMENTS

| | | |
|---|---|---|
| KR | 10-1987-0010741 | 11/1987 |
| KR | 10-1992-0022849 | 12/1992 |
| KR | 10-1992-0022852 | 12/1992 |
| KR | 10-1999-0069886 | 9/1999 |
| KR | 20-2000-0000014 | 1/2000 |
| KR | 10-2011-0061187 | 6/2011 |
| KR | 10-2015-0093425 | 8/2015 |
| KR | 10-2016-0072015 | 6/2016 |

OTHER PUBLICATIONS

Written Opinion of the ISA with English translation for PCT/KR2018/014398, dated Mar. 14, 2019, 10 pages.

Notice of Preliminary Rejection dated Feb. 21, 2022 in Korean Application No. 10-2017-0184346 and English-language translation.

* cited by examiner

DISPLAY DEVICE AND CONTROL METHOD THEREFOR

This application is the U.S. national phase of International Application No. PCT/KR2018/014398 filed 22 Nov. 2018, which designated the U.S. and claims priority to KR Patent Application No. 10-2017-0184346 filed 29 Dec. 2017, the entire contents of each of which are hereby incorporated by reference.

FIELD

The disclosure relates to a display device and a control method therefor, and more particularly, to a display device capable of providing various types of content and a control method therefor.

DESCRIPTION OF RELATED ART

With the recent development of electronic technology, various display devices such as TV, a computer, and a laptop have been developed, and these display devices provide various contents to satisfy detailed requirements of consumers. For example, display devices such as a digital television (DTV) can not only provide various broadcast programs on a high-quality screen, but also provide various application programs by adding a data processing function such as a computer.

Accordingly, a user can not simply use a display device for viewing a broadcast program, but can appreciate music through a music application of the display device and execute a weather application to easily receive information on the weather.

However, in using the display device, the user generally watches the broadcast program at a location close to the display device and appreciates music at a relatively distant location from the display device.

Nevertheless, in case of the existing display device, the broadcast program selected by the user is provided without consideration of the user's location, or the music is continuously played through the music application executed by the user.

SUMMARY

The disclosure provides a display device that provides different content according to a user's life pattern and a region in which the user is located and a control method therefor.

According to an embodiment of the disclosure, a display device may include: a sensor; a display; a storage unit in which history information on content provided by the display device is stored; and a processor configured to acquire, through the sensor, information on a distance between a user and the display device if a preset event occurs, display a background screen in the display if the user is identified, on the basis of the acquired information, as existing in a first region among a plurality of regions classified according to the distance from the display device, provide content on the basis of first history information if the user is identified, on the basis of the acquired information, as existing in a second region among the plurality of regions, and provide content on the basis of second history information if the user is identified, on the basis of the acquired information, as existing in a third region among the plurality of regions, in which the first history information may include information on content provided by the display device during the existence of the user in the second region, and the second history information may include information on content provided by the display device during the existence of the user in the third region.

The history information may include information on content provided during the existence of the user in a specific region among the plurality of regions and information on a tune when the content is provided.

The first region may be a region relatively farther than the second region based on the display device, and the second region may be a region relatively farther than the third region based on the display device.

The processor may identify content provided at a time when the user is identified as existing in the second region among the content provided during the existence of the user in the second region on the basis of the first history information if the user is identified as existing in the second region, and provides the identified content, and identify content provided on the basis of the second history information at a time when the user is identified as existing in the third region among the content provided during the existence of the user in the third region if the user is identified as existing in the third region, and provides the identified content.

The processor may update the first history information on the basis of an input user command if the user command to play content different from the identified content on the basis of the first history information is input at the time when the user is identified as existing in the second region, provide the identified content on the basis of the updated first history information if the user is identified as existing in the second region after updating the first history information, update the second history information on the basis of the input user command if the user command to play content different from the identified content on the basis of the second history information is input at the time when the user is identified as existing in the third region, and provide the identified content on the basis of the updated second history information if the user is identified as existing in the third region after updating the second history information.

The processor may update the first history information on the basis of the time when the user is identified as existing in the second region if the user is identified as existing in the second region at a time different from a time when the content included in the first history information starts to be provided, provide the identified content on the basis of the updated first history information if the user is identified as existing in the second region after updating the first history information, update the second history information on the basis of the time when the user is identified as existing in the third region if the user is identified as existing in the third region at a time different from a time when the content included in the second history information starts to be provided, and provide the identified content on the basis of the updated second history information if the user is identified as existing in the third region after updating the second history information.

The processor may set content provided when the user exists in the second region according to the user command, and provide the set content regardless of the first history information if the user is identified as existing in the second region, and set content provided when the user exists in the third region according to the user command, and provide the set content regardless of the second history information if the user is identified as existing in the third region.

The display device may further include: a microphone, in which the processor may activate the microphone which is in an inactivate state if the user is identified as existing in the first region, and perform an operation corresponding to an uttered voice of the user which is input through the microphone.

The display device may further include: a communication unit, in which the processor may activate the communication unit which is in an inactivate state if the user is identified as existing in the second region, and display, in the display, the content received from the server through the communication unit.

The processor may provide at least one of weather, news, or music applications on the basis of the first history information if the user is identified as existing in the second region, and provide a broadcast program on the basis of the second history information if the user is identified as existing in the third region.

According to an embodiment of the disclosure, a control method for a display device may include: acquiring, through a sensor, information on a distance between a user and the display device if a preset event occurs, displaying a background screen in a display of the display device if the user is identified, on the basis of the acquired information, as existing in a first region among a plurality of regions classified according to the distance from the display device, providing content on the basis of first history information if the user is identified, on the basis of the acquired information, as existing in a second region among the plurality of regions, and providing content on the basis of second history information if the user is identified, on the basis of the acquired information, as existing in a third region among the plurality of regions, in which the first history information may include information on content provided by the display device during the existence of the user in the second region, and the second history information may include information on content provided by the display device during the existence of the user in the third region.

The history information may include information on content provided during the existence of the user in a specific region among the plurality of regions and information on a time when the content is provided.

The first region may be a region relatively farther than the second region based on the display device, and the second region may be a region relatively farther than the third region based on the display device.

In the providing of the content, if the user is identified as existing in the second region, content provided at a time when the user is identified as existing in the second region among the content provided during the existence of the user in the second region on the basis of the first history information may be identified, and the identified content may be provided, and if the user is identified as existing in the third region, content provided at a time when the user is identified as existing in the third region among the content provided during the existence of the user in the third region on the basis of the second history information may be identified, and the identified content may be provided.

In the providing of the identified content on the basis of the first history information, the first history information may be updated on the basis of an input user command if the user command to play content different from the identified content on the basis of the first history information is input at the time when the user is identified as existing in the second region, and the identified content on the basis of the updated first history information may be provided if the user is identified as existing in the second region after updating the first history information, and in the providing of the identified content on the basis of the second history information, the second history information may be updated on the basis of an input user command if the user command to play content different from the identified content on the basis of the first history information is input at the time when the user is identified as existing in the third region, and the identified content on the basis of the updated second history information may be provided if the user is identified as existing in the third region after updating the second history information.

In the providing of the identified content on the basis of the first history information, the first history information may be updated on the basis of the time when the user is identified as existing in the second region if the user is identified as existing in the second region at a time different from a time when the content included in the first history information starts to be provided and the identified content on the basis of the updated first history information may be provided if the user is identified as existing in the second region after updating the first history information, and in the providing of the identified content on the basis of the second history information, the second history information may be updated on the basis of the time when the user is identified as existing in the third region if the user is identified as existing in the third region at a time different from a time when the content included in the second history information starts to be provided, and the identified content on the basis of the updated second history information may be provided if the user is identified as existing in the third region after updating the second history information.

The control method for a display device may further include setting content provided when the user exists in the second region according to the user command, providing the set content regardless of the first history information if the user is identified as existing in the second region, setting content provided when the user exists in the third region according to the user command, and providing the set content regardless of the second history information if the user is identified as existing in the third region.

The control method for a display device may further include: activating a microphone which is in an inactivate state if the user is identified as existing in the first region, and performing an operation corresponding to an uttered voice of the user which is input through the microphone.

In the providing of the identified content on the basis of the first history information, the communication unit which is in an inactivate state may be activated if the user is identified as existing in the second region, and the content which is received from a server through the communication unit may be displayed in the display.

In the providing of the identified content on the basis of the first history information, at least one of weather, news, or music applications may be provided on the basis of the first history information if the user is identified as existing in the second region, and in the providing of the identified content based on the basis of the second history information, a broadcast program may be provided on the basis of the second history information if the user is identified as existing in the third region.

According to various embodiments of the disclosure as described above, a display device providing different content according to the user's life pattern and the region where the user is located and a control method therefor may be provided.

DETAILED DESCRIPTION OF EXAMPLE EMBODIMENTS

First, terms used in the present specification and claims are selected from general terms in consideration of the functions of the disclosure. However, these terms may vary depending on an intention of a person skilled in the art, a legal or technical interpretation, and an appearance of new technologies, and the like. Also, some terms are arbitrarily selected by the applicant. These terms may be interpreted as meanings defined in the present specification, and may be interpreted based on the general contents of the present specification and common technical knowledge in the art as long as terms are specifically defined.

In describing the disclosure, when it is decided that a detailed description for the known functions or configurations related to the disclosure may unnecessarily obscure the gist of the disclosure, the detailed description therefor will be omitted.

Furthermore, embodiments of the disclosure will be described in detail with reference to the accompanying drawings and the contents described in the accompanying drawings, but the disclosure is not limited or limited by the embodiments.

Hereinafter, the disclosure will be described in detail with reference to the accompanying drawings.

Figure 1:
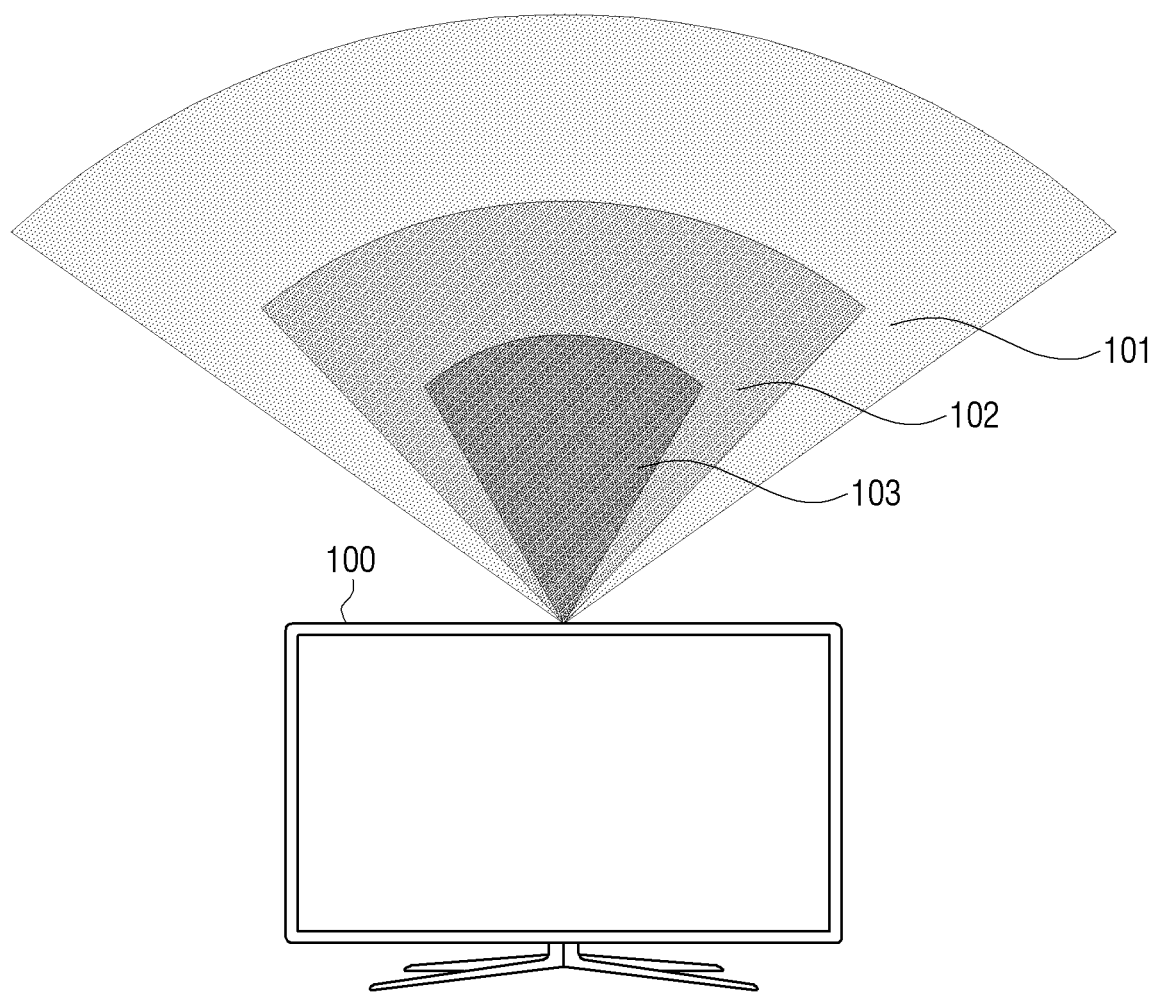
FIG. 1 is a diagram for describing an operation of a display device according to an embodiment of the disclosure.

FIG. 1 is a diagram for describing an operation of a display device according to an embodiment of the disclosure.

Referring to FIG. 1, a display device 100 according to an embodiment of the disclosure may be a smart TV. However, this is only one example, and the display device 100 may be implemented by various types of electronic devices including a display, such as a tablet, a digital camera, a camcorder, a PDA, a smart phone, and a computer.

The display device 100 may provide different content according to a region where a user is located.

Specifically, the display device 100 may provide different content according to a region if a user is identified as existing among a plurality of regions divided according to a distance from the display device 100.

Hereinafter, for convenience of description, it is described that a plurality of regions divided according to a distance from the display device 100 are assumed to be a first region 101, a second region 102, and a third region 103 as illustrated in FIG. 1. That is, it is considered that the first region 101 is a region relatively farther than the second region 102 based on the display device 100, and the second region 102 is a region relatively farther than the third region 103 based on the display device 100.

If the user is identified as existing in the first region 101, the display device 100 may display a background screen. Here, the background screen may be an image, video, or the like which is stored in the display device 100. For example, the background screen may be a photo, a clock, a fish tank, and the like, but also a 3D video and the like. In addition, the background screen may be a background image behind the display device 100. In this case, the background image may be an image acquired by a camera disposed behind the display device 100.

In addition, if the user is identified as existing in the second region 102, the display device 100 may provide content on the basis of first history information. Here, the first history information may include information on content provided by the display device 100 during the existence of the user in the second region 102. For example, when a music application is provided by the display device 100 during the existence of the user in the second region 102, the first history information may include information on the music application. As described above, when the information on the music application is stored in the first history information, if the user is identified as existing in the second region, the display device 100 may provide the music application.

If the user is identified as existing in the third region 103, the display device 100 may provide content on the basis of second history information. Here, the second history information may include information on content provided by the display device 100 during the existence of the user in the third region 103. For example, when sports broadcast content is provided by the display device 100 during the existence of the user in the third region 103, the second history information may include information on the sports broadcast content. As described above, when the information on the sports broadcast content is stored in the second history information, if the user is identified as existing in the third region 103, the display device 100 may provide the sports broadcast content.

As described above, by providing different content according to the region in which the user is located, the display device 100 according to the embodiment of the disclosure may provide content more meeting a user's purpose.

That is, if the user exists in the first region 101 which is a region relatively distant from the display device 100, the display device 100 may provide a background screen for aesthetic purposes in that the user does not generally intend to watch the display device 100, and if the user exists in the second region 102, the display device 100 may provide the music application and the like in that the user generally intends to intermittently watches the display device 100 or appreciates music played by the display device 100. In addition, if the user exists in the third region 103 which is a region relatively close to the display device 100, the display device 100 may provide specific broadcast content in that the user generally intends to watch broadcast content through the display device 100.

Meanwhile, the display device 100 according to the embodiment of the disclosure may provide content in further consideration of a time when the user is detected in providing the content on the basis of the history information. That is, the display device 100 may provide content in further consideration of the time when the user is identified as existing in a specific region.

Specifically, if the user is identified as existing in the second region 102, the display device 100 may identify content provided at the time when the user is identified as existing in the second region 102 among the content provided during the existence of the user in the second region 102 on the basis of the first history information and provide the identified content. To this end, the first history information may further include not only information on content provided during the existence of the user in the second region 102, but also information on the time when the content is provided.

For example, when the display device 100 provides the music application during a section between 7 AM and 8 AM where the user exists in the second region 102, and provides the weather application during a section between 8 AM and 9 AM where the user exists in the second region 102, the first history information may include the information that the display device 100 provides the music application during the section between 7 AM and 8 AM where the user exists in the second region 102 and provides the weather application during the section between 8 AM and 9 AM where the user exists in the second region 102.

In the state in which the first history information is stored, the display device 100 may provide the music application on the basis of the first history information when the user is identified as existing in the second region 102 during the section between 7 AM and 8 AM and may provide the weather application on the basis of the first history information if the user is identified as existing in the second region 102 during the section between 8 AM and 9 AM.

Similarly, if the user is identified as existing in the third region 103, the display device 100 may identify content provided at the time when the user is identified as existing in the third region 103 among the content provided during the existence of the user in the third region 103 on the basis of the second history information, and may provide the identified content. To this end, the second history information may further include not only information on content provided during the existence of the user in the third region 103, but also information on the time when the content is provided.

For example, when the display device 100 provides live broadcast content during a section between 7 PM and 8 PM where the user exists in the third region 103, and provides filmed TV broadcast content during a section between 8 PM and 9 PM where the user exists in the third region 103, the second history information may include the information that the display device 100 provides the live broadcast content during the section between 7 PM and 8 PM where the user exists in the third region 103 and provides the filmed TV broadcast content during the section between 8 PM and 9 PM where the user exists in the third region 103.

In the state in which the second history information is stored, the display device 100 may provide the live broadcast content on the basis of the second history information if the user is identified as existing in the third region 103 during the section between 7 PM and 8 PM and may provide the filmed TV broadcast content on the basis of the second history information if the user is identified as existing in the third region 103 during the section between 7 PM and 8 PM.

As described above, the display device 100 according to the embodiment of the disclosure may provide content that more meets user needs by providing content in further consideration of the time when the user is detected in the specific region as well as the region in which the user is located.

Figure 2:
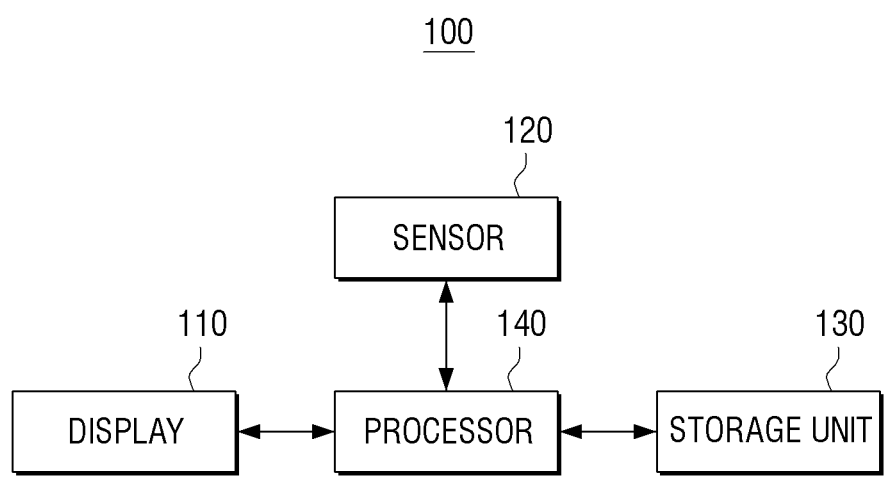
FIG. 2 is a block diagram for describing the display device according to the embodiment of the disclosure.

FIG. 2 is a block diagram for describing the display device according to the embodiment of the disclosure.

Referring to FIG. 2, the display device 100 according to the embodiment of the disclosure includes a display 110, a sensor 120, a storage unit 130, and a processor 140.

The display 110 may display various screens.

The display 110 may display a background screen. Here, the background screen may be a video as well as a still image. For example, the background screen may be a photo, a clock, a fish tank, and the like, but also a 3D video and the like. In addition, the background screen may be a background image behind the display device 100. In this case, the background image may be an image acquired by a camera disposed behind the display device 100.

In addition, the display 100 may display multimedia content such as a picture, and may also display a broadcast program.

The display 110 may be implemented by various types of displays such as a liquid crystal display (LCD), an organic light emitting diode (OLED) display, a liquid crystal on silicon (LCoS), digital light processing (DLP), and the like. In addition, a driving circuit, a backlight unit, and the like, that may be implemented in a form such as a-si TFT, low temperature poly silicon (LTPS) TFT, an organic TFT (OTFT), and the like, may be included in the display 110.

The sensor 120 may detect a distance between the user and the display device 100.

To this end, the sensor 120 may be implemented by a pyroelectric infrared ray) sensor, a proximity sensor, an ultrasonic sensor, an illuminance sensor, an acceleration sensor, and the like.

Here, the PIR sensor may measure infrared rays to detect the distance between the user and the display device 100. Specifically, the PIR sensor may detect infrared rays having a specific wavelength, which is emitted from a human body, to detect the distance between the user and the display device 100.

The proximity sensor may use electromagnetic field strength to detect the distance between the user and the display device 100. For example, the proximity sensor may be implemented in various forms such as a high-frequency oscillation type, a capacitive type, a magnetic type, a spectator type, and an ultrasonic type according to a detection principle to sense the distance between the user and the display device 100.

Then, the ultrasonic sensor may output a signal to the front of the display device 100 and then detect the distance between the user and the display device 100 using a signal which is input by being reflected by the user.

The illuminance sensor may measure the brightness of the space where the user is located and detect a user's movement when the illuminance change is detected, and the acceleration sensor may measure dynamic forces such as acceleration due to a user's motion to measure the user's motion.

Meanwhile, the sensor of the above-described type is only one example, and the sensor 110 may be implemented by another type of sensor capable of detecting the distance between the user and the display device 100.

The sensor 120 may be provided inside the display device 100. However, this is only one example, and the sensor 120 may be provided in one region of the display panel.

The storage unit 120 may store an operating system (OS) for controlling an overall operation of the components of the display device 100 and commands or data related to the components of the display device 100.

Accordingly, the processor 140 may control a number of hardware or software components of the display device 100 using various commands or data stored in the storage unit 130, load and process the commands or data received from at least one of other components in a volatile memory, and store various data in the non-volatile memory.

In particular, the storage unit 130 may store history information on content provided by the display device 100.

Here, the history information may include information on content provided during the existence of the user in a specific region among a plurality of regions classified according to the distance from the display device 100 and information on a time when content is provided.

For example, when the user executes a weather application during a section between 7 AM and 8 AM in the specific region among the plurality of regions classified according to the distance from the display device 100, the history information may include information that the user executes the weather application during the section between 7 AM and 8 AM in the specific region.

The history information may be classified into first history information and second history information and stored. Here, the first history information may include information on content provided by the display device 100 during the existence of the user in the second region 102 among the plurality of regions classified according to the distance from the display device 100 and information on a time when content is provided. The second history information may include information on content provided by the display device 100 during the existence of the user in the third region 103 among the plurality of regions classified according to the distance from the display device 100 and information on a time when content is provided.

The processor 140 controls an overall operation of the display device 100.

Specifically, the processor 140 may drive an operating system or an application program to control hardware or software components connected to the processor 140, and perform various kinds of data processing and calculation. In addition, the processor 140 may load and process commands or data received from at least one of other components in a volatile memory, and store various data in a non-volatile memory.

To this end, the processor 140 may be implemented by a dedicated processor (for example, an embedded processor) for performing a corresponding operation or a generic-purpose processor (for example, a CPU or an application processor) capable of performing the corresponding operations by executing one or more software programs stored in a memory device.

When a predetermined event occurs, the processor 140 may acquire the information on the distance between the user and the display device 100 through the sensor 120.

Specifically, the processor 140 may activate the sensor 120 in an inactive state when the, predetermined event occurs. In this case, the sensor 120 may detect the distance between the user and the display device 100 and transmit the information on the distance between the user and the display device 100 to the processor 140. Accordingly, the processor 140 may acquire the information on the distance between the user and the display device 100.

Here, the preset event may be a case where the display device 100 is in communication with the user terminal device. For example, the preset event may be a case where the user terminal device is in communication with the display device 100 as the user having the user terminal device enters a home.

Also, the preset event may be a case where a sensing signal is received from an IoT device. Here, the IoT device may be a door lock device on a front door. In this case, the preset event may be a case where a sensing signal is received from the door lock device by allowing a user to open the door lock device of the front door.

Meanwhile, the door lock device is only one example of an IoT device, and the IoT device may be various types of electronic devices such as an air conditioner, a lighting device, and a computer. For example, the preset event may be a case where a sensing signal is received from the lighting device by allowing a user to turn on the lighting device in an off state.

In addition, the above-described preset event is only one example, and the preset event may be various situations in which a user enters a region where the display device 100 exists. For example, the display device 100 may identify the location of the electronic device, which is in communication, through GPS, and when it is identified that the electronic device has entered a home, it may be considered that the preset event has occurred.

The processor 140 may identify a region in which the user exists based on the information on the distance between the user and the display device 100 acquired through the sensor 120.

Specifically, the processor 140 may identify a region in which a user exists among the plurality of regions classified according to the distance from the display device 100 on the basis of the information acquired through the sensor 120.

Here, as described above, the plurality of regions may be the first region 101, the second region 102, and the third region 103. The first region 101 may be a region relatively farther than the second region 102 based on the display device 100, and the second region 102 may be a region relatively farther than the third region 103 based on the display device 100.

For example, the first region 101 may be a region between 5 m and 10 m based on the display device 100, the second region 102 may be a region between 2 m and 5 m based on the display device 100, and the third region 103 may be a region between 0 m and 2 m based on the display device 100. Meanwhile, this is only one example, and the first to third regions 101, 102, and 103 may be variously set according to a user.

Thereafter, the processor 140 may provide different content according to a region where a user exists.

Hereinafter, the content provided by the processor 140 of the disclosure will be described in detail with reference to FIGS. 3 to 6 together.

Figure 3:
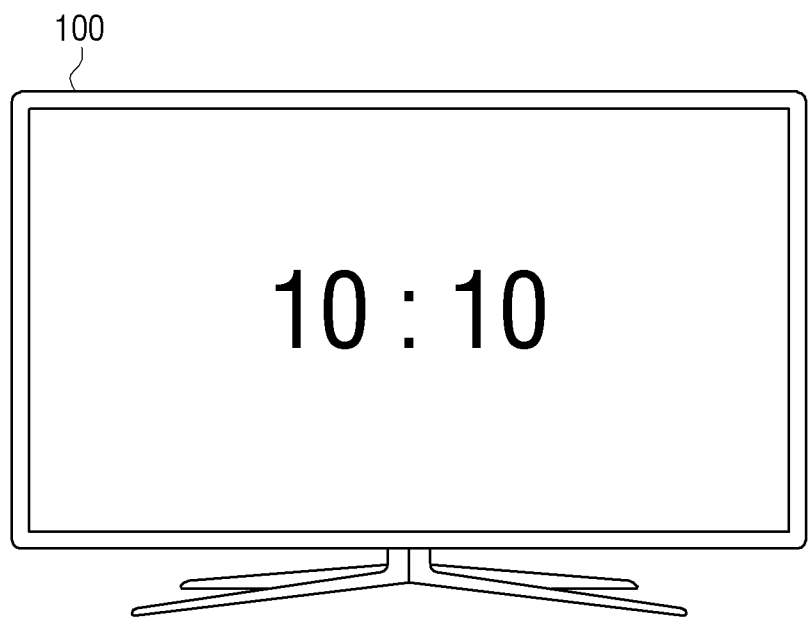
FIG. 3 is a diagram for describing content provided if a user is identified as existing in a first region according to the embodiment of the disclosure.

FIG. 3 is a diagram for describing content provided if a user is identified as existing in a first region according to the embodiment of the disclosure.

If the user is identified, on the basis of the information acquired through the sensor 120, as existing in the first region 101 among the plurality of regions classified according to the distance from the display device 100, the processor 140 may display the background screen in the display 110.

Here, the background screen may be an image, video, or the like which is stored in the display device 100. For example, referring to FIG. 3, the background screen may be a clock. However, this is only one example, and the background screen may be a photo, a clock, a fish tank, and the like, but also a 3D video and the like.

In addition, the background screen may be a background image behind the display device 100. In this case, the background image may be an image acquired by a camera disposed behind the display device 100.

As such, by displaying the background screen rather than a black screen, the display device 100 may give an aesthetic sense to a user.

Figure 4:
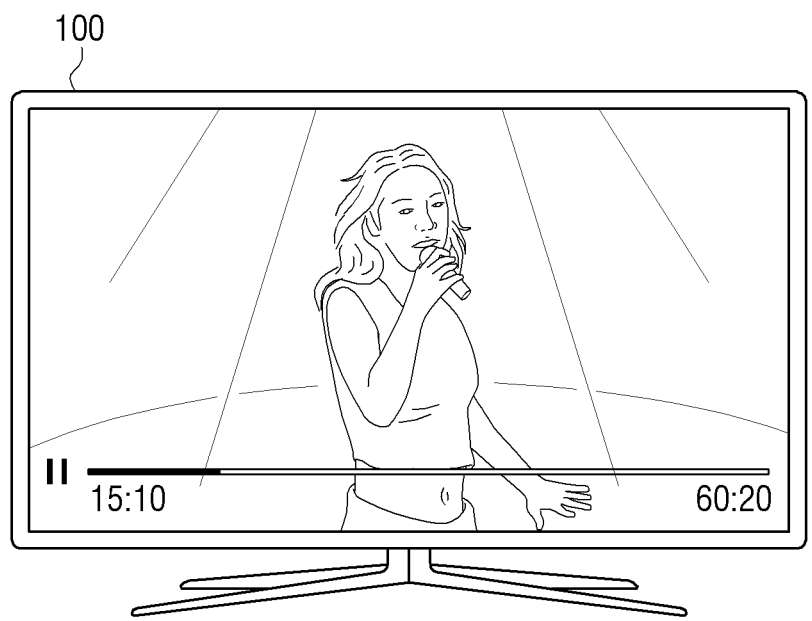
FIG. 4 is a diagram for describing content provided if the user is identified as existing in a second region according to the embodiment of the disclosure.

FIG. 4 is a diagram for describing content provided if the user is identified as existing in a second region according to the embodiment of the disclosure.

If a user is identified, on the basis of the information acquired through the sensor 120, as existing in the second region 102 among the plurality of regions, the processor 140 may provide content based on the first history information.

Here, the first history information may include information on content provided from the display device 100 during the existence of the user in the second region 102. For example, when a music application is provided from the display device 100 during the existence of the user in the second region 102, the first history information may include information on the music application.

As described above, when the information on the music application is stored in the first history information, as illustrated in FIG. 4, if the user is identified as existing in the second region, the processor 140 may provide the music application.

Meanwhile, this is only one example, and when the news application is provided from the display device 100 during the existence of the user in the second region 102, the first history information may include information on the news application. In this case, when the user is identified as existing in the second region 102, the processor 140 may provide the news application.

Meanwhile, in providing the content on the basis of the history information, the processor 140 may provide the content in further consideration of the time when the user is identified as existing in the second region 102.

Specifically, if the user is identified as existing in the second region 102, the processor 140 may identify content provided at the time when the user is identified as existing in the second region 102 among the content provided during the existence of the user in the second region 102 on the basis of the first history information and provide the identified content.

For example, when the display device 100 provides the music application during a section between 7 AM and 8 AM where the user exists in the second region 102, and provides the weather application during a section between 8 AM and 9 AM where the user exists in the second region 102, the first history information may include the information that the display device 100 provides the music application during the section between 7 AM and 8 AM where the user exists in the second region 102 and provides the weather application during the section between 8 AM and 9 AM where the user exists in the second region 102.

In the state in which the first history information is stored, if the user is identified as existing in the second region 102 in the section between 7 AM and 8 AM, the processor 140 may provide the music application on the basis of the first history information. Then, when the user is identified as existing in the second region 102 in the section between 8 AM and 9 AM, the processor 140 may provide the weather application on the basis of the first history information.

Meanwhile, the processor 140 may update the information on the content included in the first history information.

Specifically, if the user command to play different content from the identified content on the basis of the first history information is input at the time when the user is identified as existing in the second region 102, the processor 140 may update the first history information on the basis of the input user command.

For example, when the time when the user is identified as existing in the second region 102 is 8 AM and the identified content on the basis of the first history information is the news application, if the user command to play music through the music application at the corresponding time is input, the processor 140 may update information that the music application was provided at 8 AM in the first history information.

In addition, if the user is identified as existing in the second region 102 after updating the first history information, the processor 140 may provide the identified content on the basis of the updated first history information.

In the above-described embodiment, if the user is identified as existing in the second region 102 at 8 AM after updating the first history information, the processor 140 may provide the music application.

Meanwhile, when the user command to play the content different from the identified content on the basis of the first history information is input a predetermined number of times or more, the processor 140 may update the first history information on the basis of the input user command. Here, the preset number of times may be three times, but is not limited thereto.

For example, when the time when the user is identified as existing in the second region 102 is 8 AM and the identified content on the basis of the first history information is the news application, if a user command to play music is input through the music application at least three times which are a preset number of times, the processor 140 may update information that the music application was provided at 8 AM in the first history information.

In addition, the processor 140 may update the information on the time when the content included in the first history information is provided.

Specifically, if the user is identified as existing in the second region 102 at a time different from the time when the content included in the first history information starts to be provided, the processor 140 may update the first history information on the basis of the time when the user is identified as existing in the second region 102.

For example, in the state in which the first history information includes the information that the music application is provided during the section between 7 AM and 8 AM, if the user is identified as not existing in the second region 102 during a section between 7 AM and 7:30 AM and is identified as existing in the second region 102 during a section between 7:30 AM and 8 AM, the processor 140 may update information that the music application is provided during the section between 7 AM and 8 AM, to information that the music application is provided during the section between 7:30 AM and 8 AM.

In addition, if the user is identified as existing in the second region 102 after updating the first history information, the processor 140 may provide the identified content on the basis of the updated first history information.

In the above-described embodiment, even after the first history information is updated, even if the user is identified as existing in the second region 102 at 7 AM, the processor 140 does not provide the music application and identifies that the user exists in the second region 102 at 7:30 AM, the processor 140 may provide the music application.

Meanwhile, if the user is identified as existing in the second region 102 at a time different from the time when the content included in the first history information starts to be provided a preset number of times or more, the processor 140 may update the first history information on the basis of the time when the user is identified as existing in the second region 102. Here, the preset number of times may be three times, but is not limited thereto.

Similarly, if the user is identified as moving out of the second region 102 at a time different from the time when the content included in the first history information ends, the processor 140 may update the first history information on the basis of the time when the user moves out of the second region 102.

For example, in the state in which the first history information includes information that the music application was provided during the section between 7 AM and 8 AM, if the user is identified as existing in the second region 102 at 7 AM, and then is identified as moving out of the second region 102 at 7:30 AM, the processor 140 may update the information that the music application is provided during the section between 7 AM and 8 AM to the information that the music application is provided during the section between 7 AM and 7:30 AM.

In the above-described embodiment, if the user is identified as existing in the second region 102 at 7 AM after updating the first history information, the processor 140 may provide the music application, and end providing the music application at 7:30 AM.

Meanwhile, if the user is identified as moving out of the second region 102 a preset number of times or more at a time different from the time when the content included in the first history information ends, the processor 140 may update the first history information on the basis of the time when the user moves out of the second region 102. Here, the preset number of times may be three times, but is not limited thereto.

Meanwhile, the processor 140 can use an artificial intelligence (AI) model having been taught according to at least one of machine learning, neural network and deep learning algorithms, in the providing the content.

The artificial intelligence technology is a technology that a computer machine that realizes human-level intelligence learns and judges on its own, and is a technology of improving a recognition rate as the artificial intelligence is used. The processor 140 may identify a user through deep learning using an algorithm that classifies/learns characteristics of input data by itself.

For example, the processor 140 continuously updates and accumulates the first history information in the storage unit 130, and if the user is identified as existing in the second region 102, the identified content according to the deep learning algorithm may be provided.

Meanwhile, the content included in the first history information and the information on the time when the content is provided may be classified into weekdays and weekends and stored.

For example, when the user plays music through a music application during a section between 7 AM and 8 AM from Monday to Friday, and plays music through the music application during a section between 7:30 AM and 8 AM on Saturday and Friday, the first history information may store information that the music application is provided during the section between 7 AM and 8 AM from Monday to Friday, and the music application is provided during the section between 7:30 AM to 8 AM on Saturday and Friday.

In this case, the processor 140 may provide the music application during the section between 7 AM and 8 AM from Monday to Friday on the basis of the first history information, and may provide the music application during the section between 7:30 AM and 8 AM on Saturday and Friday.

However, this is only one example, and the content included in the first history information and the information on the time when the content is provided may be classified and stored for each day of the week.

Figure 5:
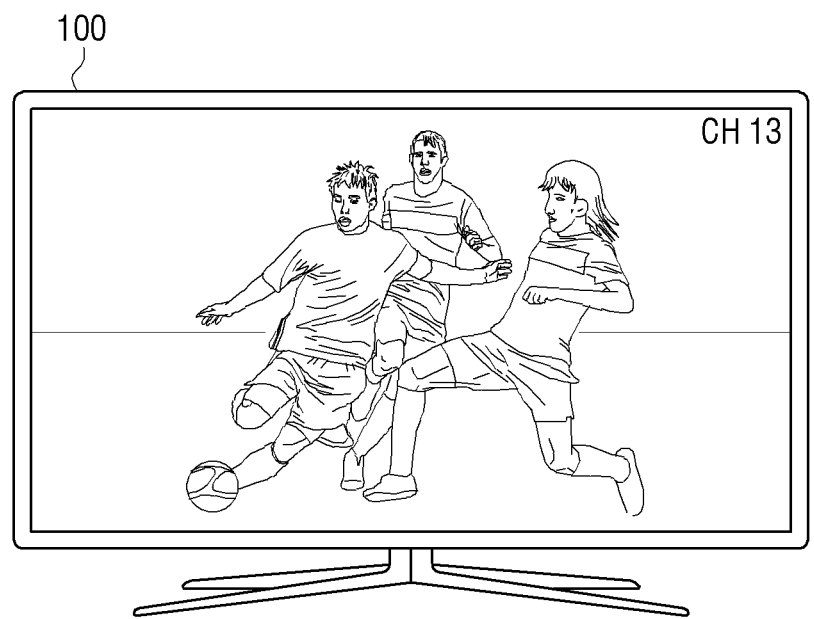
FIG. 5 is a diagram for describing content provided if the user is identified as existing in a third region according to the embodiment of the disclosure.

FIG. 5 is a diagram for describing content provided if the user is identified as existing in a third region according to the embodiment of the disclosure.

If the user is identified, on the basis of the information acquired through the sensor 120, as existing in the third region 103 among the plurality of regions, the processor 140 may provide content on the basis of the second history information.

Here, the second history information may include information on content provided by the display device 100 during the existence of the user in the third region 103. For example, when specific broadcast content is provided by the display device 100 during the existence of the user in the third region 103, the second history information may include information on the specific broadcast content.

As described above, when the information on the specific broadcast content is stored in the second history information, if the user is identified as existing in the third region 103, the processor 140 may provide the specific broadcast content. For example, when the specific broadcast content is sports broadcast content of channel 13, as illustrated in FIG. 5, if the user is identified as existing in the third region 103, the processor 140 may provide the sports broadcast content of the channel 13.

As described above, by providing different content according to the region in which the user is located, the display device 100 according to the embodiment of the disclosure may provide content meeting the user needs.

Meanwhile, in providing the content on the basis of the history information, the processor 140 may provide the content in further consideration of the time when the user is identified as existing in the third region 103.

Specifically, if the user is identified as existing in the third region 103, the processor 140 may identify content provided at the time when the user is identified as existing in the third region 103 among the content provided during the existence of the user in the third region 103 on the basis of the second history information, and may provide the identified content. To this end, the second history information may further include not only information on content provided during the existence of the user in the third region 103, but also information on the time when the content is provided.

For example, when the display device 100 provides live broadcast content during a section between 7 PM and 8 PM where the user exists in the third region 103, and provides filmed TV broadcast content during a section between 8 PM and 9 PM where the user exists in the third region 103, the second history information may include the information that the display device 100 provides the live broadcast content during the section between 7 PM and 8 PM where the user exists in the third region 103 and provides the filmed TV broadcast content during the section between 8 PM and 9 PM where the user exists in the third region 103.

In the state in which the second history information is stored, if the user is detected in the third region 103 at 7 PM, the processor 140 may provide the live broadcast content. That is, if the user is identified as existing in the third region 103 between 7 PM and 8 PM, the processor 140 may provide the live broadcast content on the basis of the second history information. If the user is identified as existing in the third region 103 between 8 PM and 9 PM, the processor 140 may provide the filmed TV broadcast content on the basis of the second history information.

Meanwhile, the processor 140 may update the information on the content included in the second history information.

Specifically, if the user command to play different content from the identified content on the basis of the second history information is input at the time when the user is identified as existing in the third region 103, the processor 140 may update the second history information on the basis of the input user command.

For example, when the time when the user is identified as existing in the third region 103 is 9 AM and the identified content on the basis of the second history information is the sports broadcast content of the channel 13, if the user command to change the channel 13 to channel 7 at the corresponding time is input, the processor 140 may update the information that the broadcast content of the channel 7 is provided at 9 AM in the second history information.

In addition, if the user is identified as existing in the third region 103 after updating the second history information, the processor 140 may provide the identified content on the basis of the updated second history information.

For example, in the above-described embodiment, if the user is identified as existing in the third region 103 at 9 AM after updating the second history information, the processor 140 may provide the broadcast content of the channel 7.

Meanwhile, when the user command to play the content different from the identified content on the basis of the second history information is input a predetermined number of times or more, the processor 140 may update the second history information on the basis of the input user command. Here, the preset number of times may be three times, but is not limited thereto.

For example, when the time when the user is identified as existing in the third region 103 is 9 AM and the identified content on the basis of the second history information is the sports broadcast content of the channel 13, if the user command to change the channel 13 to channel 7 three times or more, which are a preset number of times, at the corresponding time is input, the processor 140 may update the information indicating that the broadcast content of the channel 7 is provided at 9 AM in the second history information.

In addition, the processor 140 may update the information on the time when the content included in the second history information is provided.

Specifically, if the user is identified as existing in the third region 103 at a time different from the time when the content included in the second history information starts to be provided, the processor 140 may update the second history information on the basis of the time when the user is identified as existing in the third region 103.

For example, in the state in which the second history information includes the information that the sports broadcast content is provided during the section between 8 AM and 9 AM, if the user is identified as not existing in the third region 103 during the section between 8 AM and 8:30 AM and is identified as existing in the third region 103 during the section between 8:30 AM and 9 AM, the processor 140 may update information that the sports broadcast content is provided during the section between 8 AM and 9 AM, to information that the sports broadcast content is provided during the section between 8:30 AM and 9 AM.

In addition, if the user is identified as existing in the third region 103 after updating the second history information, the processor 140 may provide the identified content on the basis of the updated second history information.

In the above-described embodiment, even if the user is identified as existing in the third region 103 at 8 AM after the second history information is updated, the processor 140 does not provide the sports broadcast content, and if a user is identified as existing in the third region 103 at 8:30 AM, the processor 140 may provide the spoils broadcast content.

Meanwhile, if the user is identified as existing in the third region 103 at a time different from the time when the content included in the second history information starts to be provided a preset number of times or more, the processor 140 may update the second history information on the basis of the time when the user is identified as existing in the third region 103. Here, the preset number of times may be three times, but is not limited thereto.

Similarly, if the user is identified as moving out of the third region 103 at a time different from the time when the content included in the second history information ends, the processor 140 may update the first history information on the basis of the time when the user moves out of the third region 103.

For example, in the state in which the first history information includes information that the sports broadcast content is provided during the section between 8 AM and 9 AM, if the user is identified as existing in the second region 102 at 8 AM, and then is identified as moving out of the third region 103 at 8:30 AM, the processor 140 may update the information that the sports broadcast content is provided during the section between 8 AM and 9 AM to the information that the sports broadcast content provided during the section between 8 AM and 8:30 AM.

In the above-described embodiment, if the user is identified as existing in the third region 103 at 8 AM after updating the first history information, the processor 140 may provide the sports broadcast content, and end providing the sports broadcast content at 8:30 AM.

Meanwhile, if the user is identified as moving out of the third region 103 a preset number of times or at a time different from the time when the content included in the second history information ends, the processor 140 may update the second history information on the basis of the time when the user moves out of the third region 103. Here, the preset number of times may be three times, but is not limited thereto.

Meanwhile, the content included in the second history information and the information on the time when the content is provided may be classified into weekdays and weekends and stored.

For example, when the user plays sports broadcast content during a section between 8 AM and 9 AM from Monday to Friday, and plays sports broadcast content during a section between 8:30 AM and 9 AM on Saturday and Friday, the second history information may store information that the sports broadcast content is provided during the section between 8 AM and 9 AM from Monday to Friday, and the sports broadcast content is provided during the section between 8:30 AM to 9 AM on Saturday and Friday.

In this case, the processor 140 may provide a sports broadcast content during the section between 8 AM and 9 AM from Monday to Friday on the basis of the second history information, and may provide the sports broadcast content during the section between 8:30 AM and 9 AM on Saturday and Friday.

However, this is only one example, and the content included in the second history information and the information on the time when the content is provided may be classified and stored for each day of the week.

As described above, the display device 100 according to the embodiment of the disclosure may provide content that more meets user needs by providing content in further consideration of the time when the user is detected in the specific region as well as the region in which the user is located.

Figure 6:
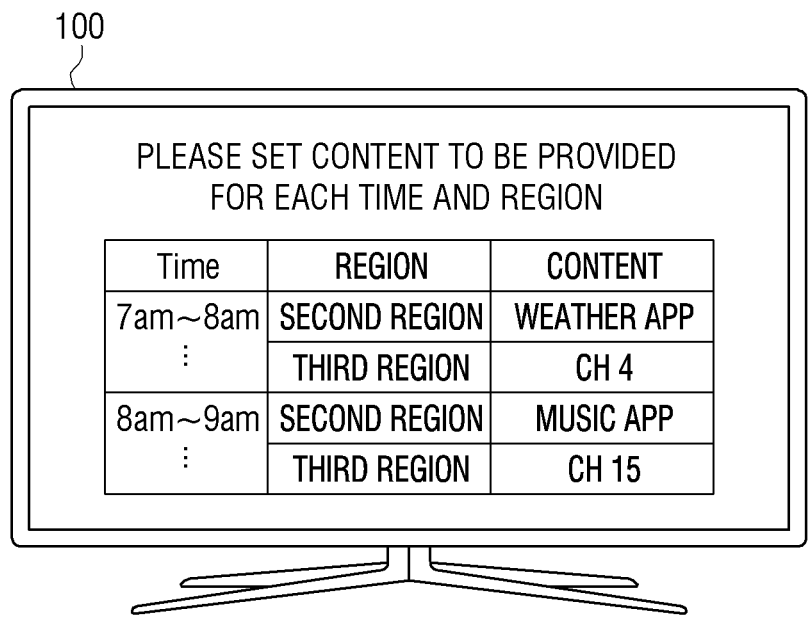
FIG. 6 is a diagram for describing a case where the display device according to the embodiment of the disclosure provides content.

FIG. 6 is a diagram for describing a case where the display device according to the embodiment of the disclosure provides content.

The embodiment in which content is provided based on the history information when the existence of the user is identified in one of the second region 120 and the third region 130 has been described.

Unlike this, the display device 100 according to the embodiment of the disclosure may provide content set according to the user command.

The processor 140 may set at least one of content to be provided when the user exists in the second region 102 and content to be provided when the user exists in the third region 103 according to the user command.

For example, when the user command for setting content to be provided for each time and region is input, as illustrated in FIG. 6, the processor 140 may display a UI for receiving the user command.

Here, when the user command for inputting content to be provided for each time and region is input, the processor 140 may provide the content set according to the user command regardless of the history information.

For example, when the weather application is set as content to be provided when the user exists in the second region 102 during a section between 7 AM and 8 AM, even if the identified content on the basis of the first history information is the music application, if the user is identified as existing in the second region 102 at 7 AM, the processor 140 may provide the weather application regardless of the first history information.

Similarly, when broadcast content of channel 4 is set as content to be provided when the user exists in the third region 103 during a section between 7 AM and 8 AM, even if the identified content on the basis of the second history information is broadcast content of channel 5, if the user is identified as existing in the third region 103 at 7 AM, the processor 140 may provide the broadcast content of channel 4 regardless of the second history information.

Figure 7A:
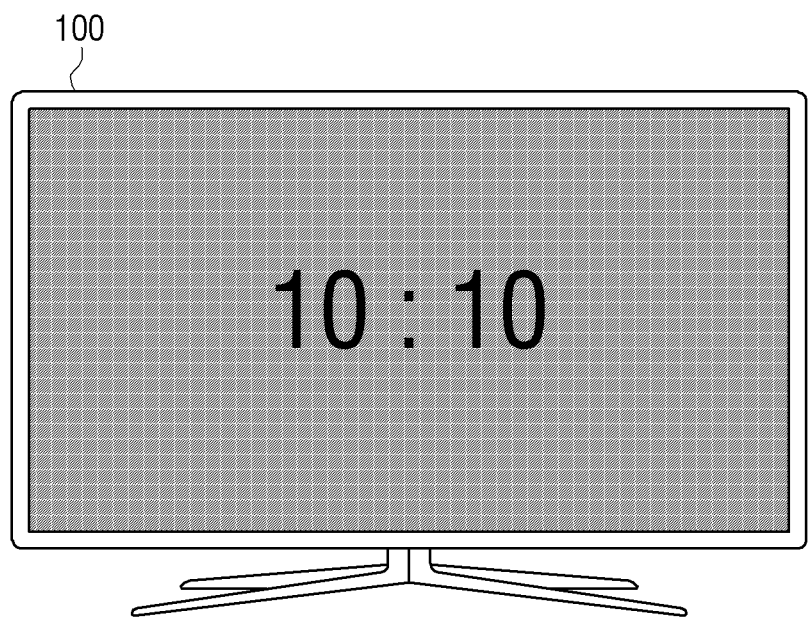
FIGS. 7A, 7B, and 7C are diagrams for describing brightness of a screen provided by the display device according to the embodiment of the disclosure.
Figure 7B:
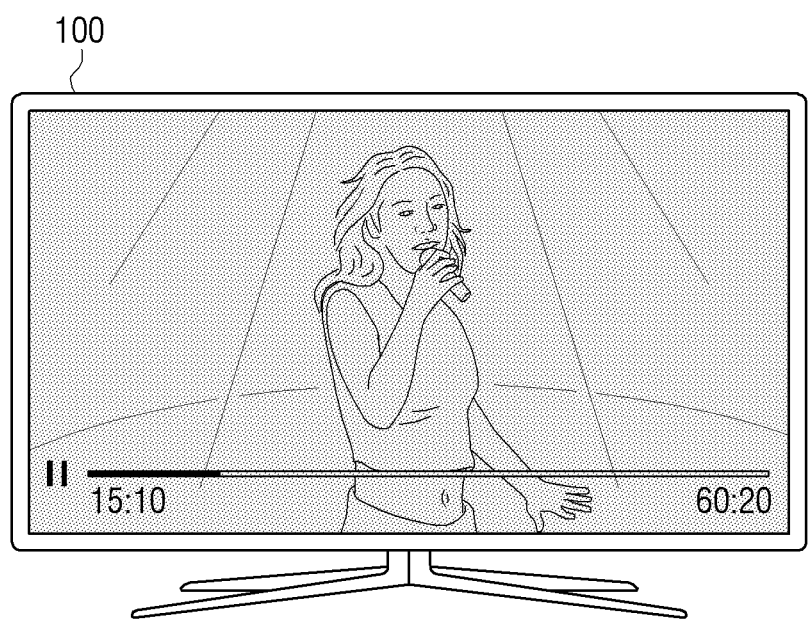
Figure 7C:
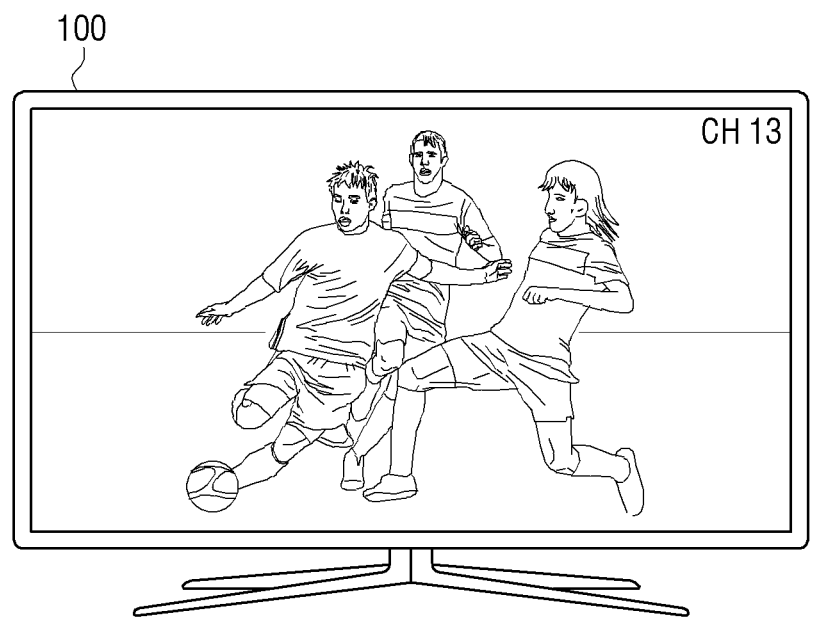

FIGS. 7A, 7B, and 7C are diagrams for describing brightness of a screen provided by the display device according to the embodiment of the disclosure.

As described above, the processor 140 may display different screens according to the region where the user exists. At this time, the processor 140 may also differently adjust the brightness of the screen provided according to the region where the user exists.

Specifically, if the user is identified as existing in the first region 101, the processor 140 may display the background screen with first brightness. Here, as illustrated in FIG. 7A, the first brightness may be relatively darker than the brightness of the general screen. This is because, in case of the background screen, it is common for a user to have no intention to watch. Therefore, power consumption may be minimized.

Then, if the user is identified as existing in the second region 102, the processor 140 may first display the content with the first brightness. Then, if the user is identified as existing in the second region 102 for a predetermined time or more, the processor 140 may display the content with second brightness that is brighter than the first brightness, as illustrated in FIG. 7B.

That is, if the user enters the second region 102, the processor 140 may display the content with the first brightness, and if the user is identified as existing in the second region 102 for a predetermined time or more, the processor 140 may display the content with the second brightness.

This is because, if the user is identified as existing in the second region 102 for a predetermined time or more, the user may be considered to have an intention to watch an image provided through the display device 100.

Meanwhile, if the user enters the third region 103, the processor 140 may display the content with third brightness. Here, the third brightness may be brighter than the second brightness, as illustrated in FIG. 7C. In general, the reason why the user enters the third region 103 is that the user can be viewed as intended to watch the content.

However, this is only one example, and if the user enters the third region 103, the processor 140 may display the content with the first brightness, and if the user is identified as existing in the third region 103 for a predetermined time or more, the processor 140 may display the content with the third brightness.

Figure 8:
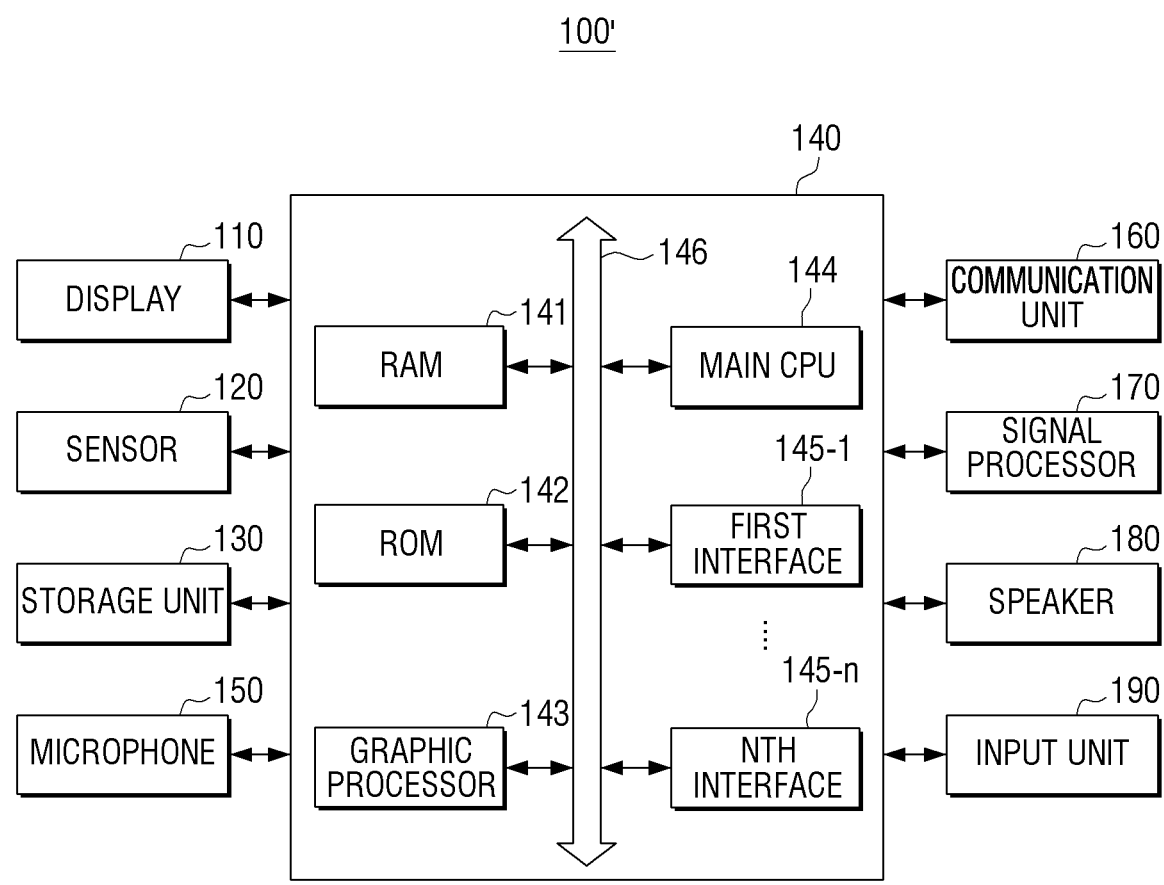
FIG. 8 is a detailed block diagram for describing the display device according to the embodiment of the disclosure.

FIG. 8 is a detailed block diagram for describing the display device according to the embodiment of the disclosure.

Referring to FIG. 8, a display device 100' according to an embodiment of the disclosure may include a display 110, a sensor 120, a storage unit 130, a processor 140, a microphone 150, a communication unit 160, a signal processor 170, a speaker 180, and an input unit 190. Hereinafter, a description of parts overlapping with the above description will be omitted or abbreviated.

The microphone 150 may input a user's uttered voice. Here, the user's uttered voice may be a voice uttered by the user to execute a specific function of the display device 100'.

Here, the microphone 150 may be activated when the user exists in the first region 101. Specifically, if the user is identified as existing outside the first region 101 on the basis of the display device 100', the processor 140 deactivates the microphone 150, and if the user is identified as existing in the first region 101, the processor 140 may activate the microphone 150 which is in the inactive state.

As described above, if the user is identified as existing in the first region 101, by activating the microphone 150, the display device 100' according to the embodiment of the disclosure may minimize power waste.

Meanwhile, when the user is in the second region 102 or the third region 103, the processor 140 may maintain the state of the activated microphone 150.

Then, if the user's uttered voice is input through the microphone, the processor 140 may perform an operation corresponding to the user's uttered voice.

Specifically, when a user's uttered voice is input through the microphone 150, the processor 140 converts the user's uttered voice as an analog signal into a digital signal (hereinafter, referred to as a voice signal) and transmits the digital signal to a server (not illustrated). To this end, the processor 140 may use an analog-to-digital converter (not illustrated).

Then, when a voice signal is received from the display device 100', the server (not illustrated) may convert the received voice signal into text. For example, if the voice signal is received, the server (not illustrated) may convert the voice signal into the text through a speech to text (STT) algorithm.

Further, the server (not illustrated) can extract an utterance element from the text. Here, the utterance element is a keyword for performing an operation requested by the user within the user's utterance voice. For example, when a voice signal corresponding to a user's voice, such as "How is tomorrow's weather in Seoul" is received from the display device 100', the server (not illustrated) may convert the voice signal into the text, and then extract the utterance elements such as "tomorrow", "Seoul", "weather" and "how".

Thereafter, the server (not illustrated) may search the weather information based on the extracted utterance elements and transmit response information including information on the searched result to the display device 100'.

Accordingly, the processor 140 may provide information about tomorrow's weather in Seoul, that is, the response information corresponding to the user's uttered voice, on the basis of the response information received from the server (not illustrated).

On the other hand, it has been above described that the display device 100' receives the response information from the server (not illustrated), but the response information on the user's uttered voice may be generated by the display device 100' itself.

For example, when the user's uttered voice such as "How is today's weather in Seoul" is input through the microphone 150, the processor 140 may convert the input voice into text, extract the utterance element from the converted text, and then search for the weather information by itself on the basis of the uttered element. In addition, when the user's uttered voice such as "turn on channel 13" is input through the microphone 150, the processor 140 may convert the input voice into the text, extract the utterance element from the converted text, and then provide the broadcast content of channel 13 to the user on the basis of the utterance element.

The communication unit 160 may communicate with various types of external devices according to various types of communication manners.

As described above, the communication unit 160 may communicate with a user terminal device or an IoT device. To this end, the communication unit 160 may include a Wi-Fi chip, a Bluetooth chip, and the like.

Further, the communication unit 160 may communicate with a server (not illustrated) to transmit and receive various data. To this end, the communication unit 160 may include a wireless communication chip.

For example, when the user's uttered voice is input through the microphone 150, the communication unit 160 may transmit the voice signal corresponding to the input user voice to the server (not illustrated). The communication unit 160 may receive response information corresponding to the voice signal from the server (not illustrated).

In addition, the communication unit 160 may communicate with various sources to receive broadcast content (or broadcast signal). The broadcast content may include video, audio, and additional data (for example, EPG), and the communication unit 160 may receive broadcast content from various sources such as terrestrial broadcast, cable broadcast, satellite broadcast, and Internet broadcast.

To this end, the communication unit 160 may include components such as a tuner (not illustrated), a demodulator (not illustrated), and an equalizer (not illustrated).

The communication unit 160 may be activated when the user exists in the second region 102. Specifically, if the user is identified as existing outside the second region 102 on the basis of the display device 100', the processor 140 deactivates the communication unit 160, and if the user is identified as existing in the second region 102, the processor 140 may activate the communication unit 160 which is in the inactive state.

As described above, if the user is identified as existing in the second region 102, by activating the communication unit 160, the display device 100' according to the embodiment of the disclosure may minimize power waste.

Meanwhile, when the user is in the third region 103, the processor 140 may maintain the state of the activated communication unit 160.

The signal processor 170 performs signal processing on the content received through the communication unit 160. Specifically, the signal processor 170 may perform operations such as decoding, scaling, and frame rate conversion on an image constituting the content, and may perform signal processing on the image in a form that can be output from the display 100'. Also, the signal processor 170 may perform signal processing such as decoding on audio constituting the content, and perform signal processing on audio in a form that can be output from the speaker 170.

Accordingly, the display 110 may display the image or the like output from the signal processor 170, and the speaker 180 may output the audio output from the signal processor 170.

The input unit 190 may receive various user commands. The processor 140 may execute a function corresponding to the user command input from the input unit 190.

For example, the input unit 190 may receive a user command for performing turn on, channel change, volume adjustment, and the like, and the processor 140 turns on the display device 100' according to the input user command or change the channel or adjust the volume.

Also, the input unit 190 may receive a user command for setting content to be provided for each time and region.

To this end, the input unit 190 may be implemented as an input panel. The input panel may be constituted by a touch pad or a key pad or a touch screen with various function keys, numeric keys, special keys, character keys, and the like.

Figure 9:
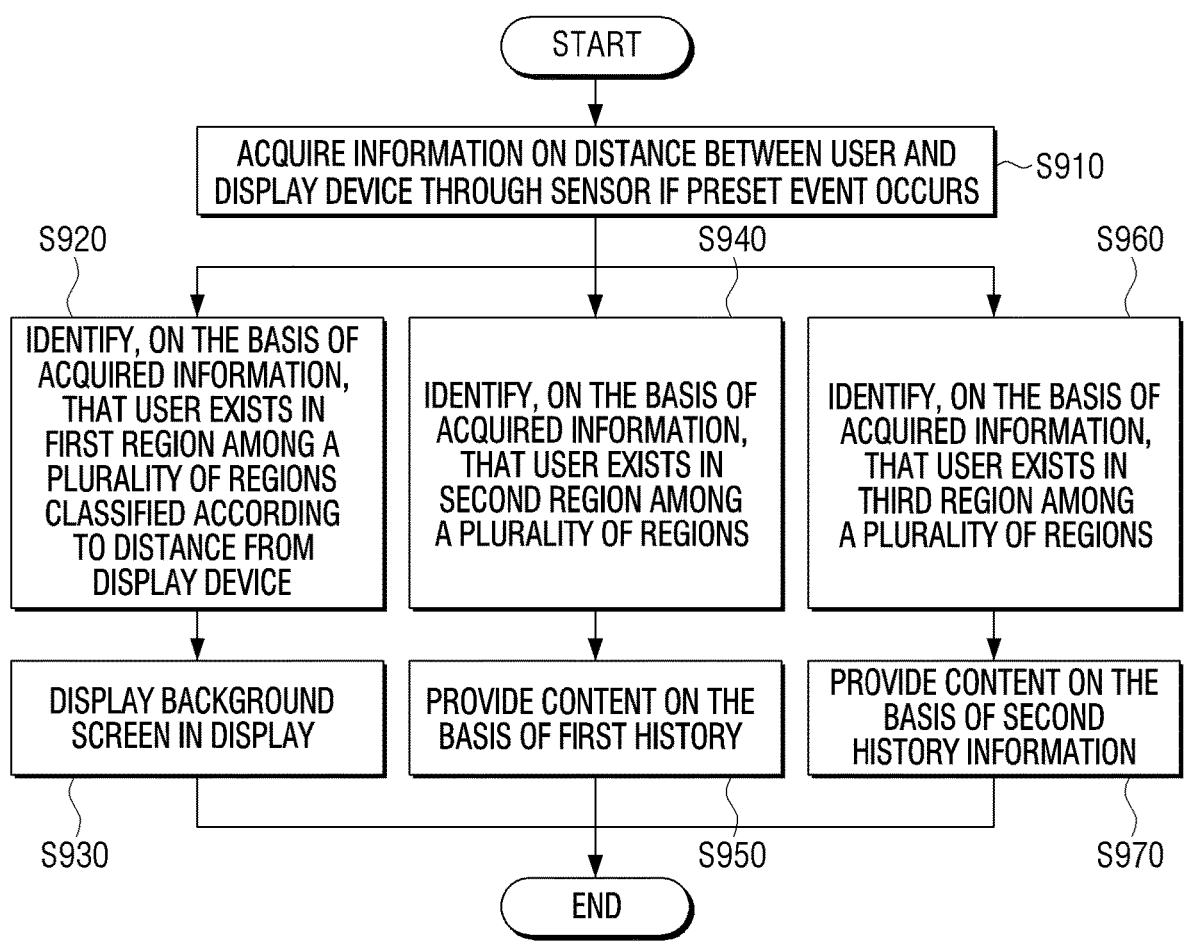
FIG. 9 is a flow chart for describing a control method for a display device according to an embodiment of the disclosure.

FIG. 9 is a flow chart for describing a control method for a display device according to an embodiment of the disclosure.

If a predetermined event occurs, the display device 100 may acquire information on a distance between the user and the display device 100 through a sensor (S910). Here, the preset event may be a case where the display device 100 is in communication with the user terminal device. For example, the preset event may be a case where the user terminal device is in communication display device 100 as the user having the user terminal device enters a home.

Then, if the user is identified, on the basis of the acquired information, as existing in the first region 101 among a plurality of regions classified according to a distance on the basis of the display device 100 (S920), the display device 100 may display the background screen in the display (S930). Here, the background screen may be an image, video, or the like which is stored in the display device 100. For example, the background screen may be a photo, a clock, a fish tank, and the like, but also a 3D video and the like. In addition, the background screen may be a background image behind the display device 100. In this case, the background image may be an image acquired by a camera disposed behind the display device 100.

Then, if the user is identified, on the basis of the acquired information, as existing in the second region among the plurality of regions (S940), the display device 100 may provide content on the basis of the first history information (S950). Here, the provided content may be at least one of weather, news, or music applications. However, this is only one example, and the content provided may be the broadcast program.

Then, if the user is identified, on the basis of the acquired information, as existing in the third region among the plurality of regions (S960), the display device 100 may provide content on the basis of the second history information (S970). Here, the provided content may be a broadcast program. However, this is only one example, and the content provided may be the weather and news applications.

Meanwhile, the methods according to various embodiments of the disclosure described above may be implemented in a form of software or application that may be installed in the existing display device.

In addition, the methods according to various embodiments of the disclosure described above may be implemented only by software upgrade or hardware upgrade of the existing display device.

In addition, various embodiments of the present disclosure described above can be performed through an embedded server provided in the display device or a server outside the display device.

Meanwhile, a non-transitory computer readable medium in which a program sequentially performing the control method for a display device according to the disclosure is stored may be provided.

The non-transitory computer-readable medium is not a medium that stores data therein for a while, such as a register, a cache, a memory, or the like, but means a medium that semi-permanently stores data therein and is readable by an apparatus. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

What is claimed is:

1. A display device, comprising:
a sensor;
a display,
a storage in which history information on content provided by the display device is stored; and
a processor configured to:
acquire, through the sensor, information on a distance between a user and the display device based on occurrence of a preset event,
display a background screen on the display based on the user being identified, based on the acquired information, as existing in a first region among a plurality of regions classified according to the distance from the display device, provide content based on first history information based on the user being identified, based on the acquired information, as existing in a second region among the plurality of regions, and
provide content based on second history information based on the user being identified, based on the acquired information, as existing in a third region among the plurality of regions,
wherein the first history information includes information on content provided by the display device during existence of the user in the second region,
the second history information includes information on content provided by the display device during existence of the user in the third region,
the first region is a region relatively farther than the second region based on the display device, and
the second region is a region relatively farther than the third region based on the display device,
wherein the processor is further configured to:
identify content provided at a time when the user is identified as existing in the second region among the content provided during the existence of the user in the second region based on the first history information, based on the user being identified as existing in the second region, and provide the identified content,
identify content provided at a time when the user is identified as existing in the third region among the content provided during the existence of the user in the third region based on the second history information, based on the user being identified as existing in the third region, and provide the identified content,
set content provided when the user exists in the second region according to a user command, and provide the set content regardless of the first history information based on the user being identified as existing in the second region,
set content provided when the user exists in the third region according to the user command, and provide the set content regardless of the second history information based on the user being identified as existing in the third region, and
provide at least one of weather, news, or music applications based on the first history information based onif the user being identified as existing in the second region, and provide a broadcast program based on the second history information based onif the user being identified as existing in the third region.

2. The display device as claimed in claim 1, wherein the first and second history information each includes information on a time when the content is provided.

3. The display device as claimed in claim 1, wherein the processor is configured to update the first history information based on an input user command based on the user command to play content different from the identified content based on the first history information being input at the time when the user is identified as existing in the second region,
provide the identified content based on the updated first history information based on the user being identified as existing in the second region after updating the first history information,
update the second history information based on the input user command based on the user command to play content different from the identified content based on the second history information being input at the time when the user is identified as existing in the third region, and
provide the identified content based on the updated second history information based on the user being identified as existing in the third region after updating the second history information.

4. The display device as claimed in claim 1, wherein the processor is configured to update the first history information based on the time when the user is identified as existing in the second region, based on the user existing in the second region at a time different from a time when the content included in the first history information starts to be provided,
provide the identified content based on the updated first history information based on the user being identified as existing in the second region after updating the first history information,
update the second history information based on the time when the user is identified as existing in the third region, based on the user existing in the third region at a time different from a time when the content included in the second history information starts to be provided, and
provide the identified content based on the updated second history information based on the user being identified as existing in the third region after updating the second history information.

5. The display device as claimed in claim 1, further comprising:
a microphone,
wherein the processor is configured to activate the microphone which is in an inactive state based on the user being identified as existing in the first region, and perform an operation corresponding to an uttered voice of the user which is input through the microphone.

6. The display device as claimed in claim 1, further comprising:
a communicator,
wherein the processor is configured to activate the communicator which is in an inactive state based on the user being identified as existing in the second region, and display, on the display, content which is received from a server through the communicator.

7. A control method for a display device, comprising:
acquiring, through a sensor, information on a distance between a user and the display device based on occurrence of a preset event; and
displaying a background screen on a display of the display device based on the user being identified, based on the acquired information, as existing in a first region among a plurality of regions classified according to the distance from the display device, providing content based on first history information based on the user being identified, based on the acquired information, as existing in a second region among the plurality of regions, and providing content based on second history information based on the user being identified, based on the acquired information, as existing in a third region among the plurality of regions,
wherein in the providing of the content,
based on the user being identified as existing in the second region, content provided at a time when the user is identified as existing in the second region among the content provided during the existence of the user in the second region based on the first history information is identified, and the identified content is provided, and
based on the user being identified as existing in the third region, content provided at a time when the user is identified as existing in the third region among the content provided during the existence of the user in the third region based on the second history information is identified, and the identified content is provided,
based on setting content provided when the user exists in the second region according to the user command, providing the set content regardless of the first history information based on the user being identified as existing in the second region,
based on setting content provided when the user exists in the third region according to the user command, providing the set content regardless of the second history information based on the user being identified as existing in the third region,
providing at least one of weather, news, or music applications based on the first history information based on the user being identified as existing in the second region, and providing a broadcast program based on the second history information based on the user being identified as existing in the third region,
wherein the first history information includes information on content provided by the display device during existence of the user in the second region,
the second history information includes information on content provided by the display device during existence of the user in the third region,
the first region is a region relatively farther than the second region based on the display device, and
the second region is a region relatively farther than the third region based on the display device.

8. The control method as claimed in claim 7, wherein the first and second history information each includes information on a time when the content is provided.

9. The control method as claimed in claim 7, wherein in the providing of the identified content based on the first history information,
based on a user command to play content different from the identified content based on the first history information being input at the time when the user is identified as existing in the second region,
the first history information is updated based on the input user command, and
the identified content based on the updated first history information is provided based on the user being identified as existing in the second region after updating the first history information, and
in the providing of the identified content based on the second history information,
based on the user command to play content different from the identified content on the basis of the first history information being input at the time when the user is identified as existing in the third region,
the second history information is updated based on an input user command, and
the identified content based on the updated second history information is provided based on the user being identified as existing in the third region after updating the second history information.

* * * * *